United States Patent
Fu et al.

(10) Patent No.: US 10,703,928 B2
(45) Date of Patent: Jul. 7, 2020

(54) AQUEOUS COATING COMPOSITIONS HAVING LOW OR ZERO VOCS AND COMPRISING ENCAPSULATED OR POLYMER ADSORBED PIGMENTS AND LETDOWN BINDERS

(71) Applicant: Rohm and Haas Company, Philadelphia, PA (US)

(72) Inventors: Zhenwen Fu, Norristown, PA (US); Ann R. Hermes, Ambler, PA (US); Wenqin Wang, Phoenixville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 212 days.

(21) Appl. No.: 15/089,633

(22) Filed: Apr. 4, 2016

(65) Prior Publication Data

US 2017/0283627 A1    Oct. 5, 2017

(51) Int. Cl.
   C09D 133/08    (2006.01)
   C08K 9/10      (2006.01)
   C09D 5/02      (2006.01)
   C09D 7/41      (2018.01)

(52) U.S. Cl.
   CPC ............ C09D 133/08 (2013.01); C09D 5/028 (2013.01); C09D 7/41 (2018.01); C08K 9/10 (2013.01); C08L 2201/54 (2013.01)

(58) Field of Classification Search
   CPC ................................ C08K 9/10; C09D 5/028
   See application file for complete search history.

(56) References Cited

U.S. PATENT DOCUMENTS

| | | | |
|---|---|---|---|
| 4,421,660 A | 12/1983 | Solc nee Hajna | |
| 4,733,005 A | 3/1988 | Schmidt et al. | |
| 5,201,948 A * | 4/1993 | Fasano | C09D 131/04 106/311 |
| 5,344,675 A | 9/1994 | Snyder | |
| 5,509,960 A | 4/1996 | Simpson et al. | |
| 5,643,974 A | 7/1997 | Simpson et al. | |
| 5,672,201 A | 9/1997 | Simpson et al. | |
| 6,080,802 A | 6/2000 | Emmons et al. | |
| 6,576,051 B2 | 6/2003 | Bardman et al. | |
| 6,756,437 B1 | 6/2004 | Xue et al. | |
| 6,833,401 B1 | 12/2004 | Xue et al. | |
| 7,081,488 B2 | 7/2006 | Bardman et al. | |
| 7,179,531 B2 | 2/2007 | Brown et al. | |
| 7,265,166 B2 | 9/2007 | Gebhard et al. | |
| 2003/0018103 A1 | 1/2003 | Bardman et al. | |
| 2007/0208129 A1 | 9/2007 | Finegan et al. | |
| 2010/0298483 A1 | 11/2010 | Allen et al. | |
| 2013/0085222 A1 | 4/2013 | Fasano et al. | |

FOREIGN PATENT DOCUMENTS

| | | |
|---|---|---|
| EP | 1802662 A1 | 7/2007 |
| EP | 2161304 A1 | 3/2010 |
| EP | 2253677 A1 | 11/2010 |
| EP | 2426166 A2 | 3/2012 |
| WO | 9925780 A1 | 5/1999 |
| WO | 2009064278 A1 | 5/2009 |
| WO | 2013002999 A1 | 1/2013 |
| WO | 2013123357 A1 | 8/2013 |
| WO | 2014169414 A1 | 10/2014 |

* cited by examiner

*Primary Examiner* — Vickey Nerangis
(74) *Attorney, Agent, or Firm* — Andrew Merriam; Cantor Colburn LLP

(57) ABSTRACT

The present invention provides aqueous compositions useful as zero VOC coating compositions having a % opacifying pigment volume concentration (% OPVC) of from 2 to 25 and comprising (i) an opacifier composition of an at least partially polymer encapsulated opacifying pigment, a polymer opacifying pigment composite or their mixtures, with the opacifying pigment, encapsulated in and/or as a composite with at least one soft polymer having a measured glass transition temperature (measured Tg) of 5° C. or less, and (ii) a hard binder polymer having a measured Tg of at least 30° C. and a weight average particle size of 120 nm or less, wherein the ratio of the weight average particle size of the opacifier composition to that of the hard binder polymer is from 2:1 to 12:1 and the volume ratio of the opacifying pigment to the soft polymer solids in the opacifier composition is from 2:5 to 1:1.

15 Claims, No Drawings

AQUEOUS COATING COMPOSITIONS HAVING LOW OR ZERO VOCS AND COMPRISING ENCAPSULATED OR POLYMER ADSORBED PIGMENTS AND LETDOWN BINDERS

The present invention relates to aqueous compositions having very low (<25 g/l) or zero volatile organic content (VOC) for use in making coating compositions for direct-to-metal (DTM) application that provide coatings with good block resistance and hardness and reasonable gloss. More particularly, it relates to aqueous compositions having a % opacifying pigment volume concentration (% OPVC) of 25 or less, or, preferably, 20 or less comprising an opacifier composition in the form of particles chosen from an at least partially polymer encapsulated opacifying pigment, a polymer opacifying pigment composite and their mixtures, the opacifying pigment, preferably, $TiO_2$, encapsulated in and/or as a composite with at least one soft polymer having a measured glass transition temperature (measured Tg) of 5° C. or less, or, preferably, 0° C. or less, and, further comprising, at least one hard binder polymer composition having a Tg of at least 30° C., or, preferably, at least 50° C., wherein the hard binder polymer has a weight average particle size of 150 nm or less, or, 120 nm or less, or, preferably, 100 nm or below, and, further wherein, the ratio of the weight average particle size of the opacifier composition to that of the hard binder polymer is at least 2:1 and up to 12:1, or, 10:1 or less, or, preferably, at least 3:1.

Direct-to-metal coatings have historically required polymers having a high glass transition temperature (Tg) to ensure hardness and block resistance of coatings made from them. However, the resulting coatings typically require high coalescent levels, thereby resulting in a high VOC content. Because of their high VOC a lot of solvent remains trapped inside the coating during the early stages of film formation, causing the coating films, at least initially, to have low hardness and poor block resistance.

U.S. patent publication 2010/0298483 A1 to Allen et al. discloses opacifying pigments having an average particle diameter of from 0.005 to 5 microns (5 to 5000 nm) that are at least partially encapsulated in a polymer, such as an aqueous emulsion copolymer, as well as polymer compositions useful in coatings or plastic containing the encapsulated pigment and a binder which may be the polymer encapsulating the pigment, a separate polymer, or both. The encapsulating polymer may be a multistage polymer containing a crosslinked phase, wherein all phases have a Tg of less than or equal to 5° C. The publication provides pigments which exhibit good hiding efficiency; however, the publication does not disclose volatile organic compound contents or any compositions that have a low VOC for any purpose. The publication fails to provide compositions showing good hardness and block resistance during and after film formation.

The present inventors have sought to solve the problem of providing zero or very low VOC (<25 g/l) aqueous compositions that provide coatings having high hardness and good block resistance.

STATEMENT OF THE INVENTION

1. In accordance with the present invention, aqueous compositions having a % opacifying pigment volume concentration (% OPVC) of from 2 to 25, or, preferably, 20 or less comprising (i) at least one opacifier composition in the form of particles chosen from an at least partially polymer encapsulated opacifying pigment, a polymer opacifying pigment composite and their mixtures, the opacifying pigment, preferably comprising titanium dioxide ($TiO_2$), encapsulated in and/or as a composite with at least one soft polymer having a measured glass transition temperature (measured Tg) of 5° C. or less, such as from −60° C. to 5° C., or, preferably, 0° C. or less, and (ii) a hard binder polymer having a measured Tg of at least 30° C., or, preferably, at least 50° C., wherein the hard binder polymer has a weight average particle size of from 40 to 150 nm, or, 120 nm or less, or, preferably, 50 nm or more, or, preferably, 100 nm or below, further wherein, the ratio of the weight average particle size of the opacifier composition to that of the hard binder polymer is at least 2:1 and up to 12:1, or, 10:1 or less, or, preferably, at least 3:1, and, still further wherein the volume ratio of the opacifying pigment to the soft polymer solids in the total (i) opacifier composition is from 2:5 to 1:12, or, preferably, 1:3 to 1:9.

2. In accordance with the present invention in 1, above, the (i) at least one opacifier composition has a weight average particle size of 220 nm to 1500 nm, or, preferably, 260 nm or more.

3. In accordance with the present invention in any of 1 or 2, above, the soft polymer in the (i) opacifier composition and the (ii) hard binder polymer are each emulsion copolymers.

4. In accordance with the present invention in any of 1, 2 or 3, above, the soft polymer in the (i) opacifier composition comprises less than 20 wt. % of any polymer having a measured Tg of above 5° C., for example, having a measured Tg of from 5 to 60° C.

5. In accordance with the present invention in any of 1, 2, 3, or 4, above, the opacifying pigment in the (i) opacifier composition has an index of refraction [nD (20° C.)] that is at least 1.8, preferably, at least 1.9.

6. In accordance with the present invention in 5, above, the in the (i) opacifier composition preferably comprises as an opacifying pigment titanium dioxide ($TiO_2$).

7. In accordance with the present invention, methods of making the aqueous composition of 1, above, comprises providing an aqueous composition of at least one opacifying pigment having an having a weight average particle size of at least 150 nm to 1200 nm, or 200 nm or more, or, preferably, 230 nm or more, (i) forming an opacifier composition by one of 1) aqueous emulsion copolymerizing a monomer mixture to form soft polymer in the presence of the aqueous composition of the at least one opacifying pigment to form an at least partially soft polymer encapsulated opacifying pigment, 2) combining an aqueous composition of a phosphorus acid group containing soft polymer with the aqueous composition of the at least one opacifying pigment to form a polymer opacifying pigment composite, or 3) their combination; and (ii) combining the opacifier composition with a hard binder polymer to form an aqueous composition having a % opacifying pigment volume concentration of from 2 to 25, or, preferably, 20 or less.

8. In accordance with the methods of 7, above, wherein the hard binder polymer and soft polymer of the opacifier composition are each emulsion copolymers.

9. In accordance with the methods of any of 7 or 8, above, wherein the opacifying pigment has an index of refraction [nD (20° C.)] that is at least 1.8, or, preferably, at least 1.9.

10. In accordance with the methods of 9, above, wherein the opacifying pigment is titanium dioxide ($TiO_2$).

All ranges, including proportions, properties of matter and particle sizes of all kinds, are inclusive and combinable. For example, a hard binder polymer weight average particle size of from 40 to 150 nm, or, 120 nm or less, or, preferably, 50 nm or more, or, preferably, 100 nm or below, includes ranges of from 40 to 150 nm, from 40 to 120 nm, from 40 to 100 nm, from 40 to 50 nm, from 50 to 150 nm, from 50 to 120 nm, from 100 to 120 nm, from 100 to 150 nm, from 120 to 150 nm, or, preferably, from 50 to 100 nm.

Unless otherwise specified, all temperature units refer to room temperature (~20-25° C.) and all pressure units refer to standard pressure.

All phrases comprising parentheses denote either or both of the included parenthetical matter and its absence. For example, the phrase "(meth)acrylate" includes, in the alternative, acrylate and methacrylate.

As used herein, the term "acrylic", refers to any polymer which is the copolymerization product of more than 50 wt. %, based on the total weight of monomers used to make the polymer, of acrylic or methacrylic monomers, including acid, ester, amide, amine or alcohol functional acrylic monomers. Such polymers may comprise copolymers with vinyl monomers like styrene and vinyl esters. As used herein, the term "styrene acrylic" or "vinyl acrylic" refers to a copolymer which is the copolymerization of more than 75 wt. %, based on the total weight of monomers used to make the copolymer, respectively, of styrene and acrylic monomers or vinyl and acrylic monomers.

As used herein, the term "aqueous" means water or a mixture of water and a minor portion (no more than 50 wt. %, based on the total weight of the water and any solvent) of one or more water miscible solvent.

As used herein, the term "ASTM" refers to publications of ASTM International, West Conshohocken, Pa.

As used herein, the term "polymer opacifying pigment composite" includes at least an opacifying pigment particle having a plurality of emulsion polymer particles adsorbed onto the surface of the opacifying pigment particle. These particles may be formed by admixing opacifying pigment particles and adsorbing emulsion polymer particles.

As used herein, the term "at least partially polymer encapsulated opacifying pigment" means that, as determined by a scanning electron micrograph at least 50% of the surface area of the pigment particle is in contact with the soft polymer composition; preferably greater than 75%, more preferably greater than 90%, and most preferably 100% of the surface area of the particle is in contact with the soft polymer composition.

As used herein, the term "% opacifying pigment volume concentration" or % OPVC refers to the quantity calculated by the following formula:

$$OPVC(\%) = \frac{\text{Volume of opacifying pigment(s)}}{\text{Total dry volume of coating}} \times 100.$$

As used herein, the term "% pigment volume concentration" or % PVC refers to the quantity calculated by the following formula:

$$PVC(\%) = \frac{\text{Volume of opacifying pigment(s) +} \atop \text{volume of filler(s) + volume of extenders}}{\text{Total dry volume of coating}} \times 100.$$

As used herein, unless otherwise indicated, the term "measured glass transition temperature" or "measured Tg" refers to the glass transition temperature of a material as determined by Differential Scanning Calorimetry (DSC) scanning between −90° C. to 150° C. while heating at a rate of 20° C./min on a DSCQ2000 (TA Instrument, New Castle, Del.), with each sample analyte being dried overnight in an oven at 60° C. before measurement then heated (ramped) to the 150° C. and equilibrated at 150° C. for 5 min, cooled down to −90° C. and ramped to 150° C. again at a heating rate of 20° C./min. The measured Tg was taken as the inflection point of the second heating scan from −90° C. to 150° C. at a heating rate of 20° C./min. The measured Tg is the inflection point of the curve of heat flow vs. temperature or the maximum value on the plot of its derivative. As used herein, the measured Tg of an emulsion copolymer composition of two or more emulsion copolymers, such as two soft polymers, is the weighted average of the Tgs of all such emulsion copolymers making up the given polymer composition, i.e., binder or encapsulating polymer composition. For example, the Tg of a soft polymer composition comprising 80 wt. % of an emulsion copolymer having a Tg of 0° C. and 20 wt. % of an emulsion copolymer having a Tg of 20° C. is defined to be 4° C.

As used herein, the term "solids" or "total solids" on a given material or composition refers to all matter in that material or composition that is non-volatile in conditions of atmospheric pressure and room temperature. Water, ammonia and volatile solvents are not considered solvents.

As used herein, the term "structural unit" of the named monomer, refers to the remnant of the monomer after polymerization. For example, a structural unit of methyl methacrylate is as illustrated where the dotted lines represent the points of attachment of the structural unit to the polymer backbone:

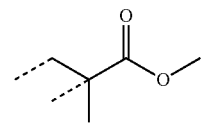

As used herein, unless otherwise specified, the term "weight average particle size" for any polymer, copolymer, pigment, extender or filler refers to a particle size measured by light scattering using a BI-90+ particle size analyzer (Brookhaven Instruments Corp. Holtsville, N.Y.) and taking the weight average of the particle size distribution. As used herein, the weight average particle size of any composition of two or more different materials, e.g. opacifying pigment compositions of two or more opacifying pigments, such as titanium dioxide and zirconium oxides, is the weighted average of the weight average particle sizes of each material, e.g. each opacifying pigment, making up the given composition. For example, the weight average particle size of an opacifying pigment composition comprising 80 wt. % of a $TiO_2$ having a weight average particle size of 270 nm and 20 wt. % of zirconium oxide having a weight average particle size of 135 nm is defined to be 243 nm.

As used herein, the phrase "wt. %" stands for weight percent.

The volume ratio of opacifying pigment to the soft polymer solids in the encapsulated opacifying pigment or polymer opacifying pigment composite is determined as follows:

((Weight of opacifying pigment)/(density of opacifying pigment))/((weight of soft polymer in the opacifying composition/(density of soft polymer)).

The present invention provides aqueous compositions useful to make zero VOC coating compositions that provide coatings having better block resistance and higher Konig hardness than conventional paints having a much higher VOC. In the present invention, the polymers encapsulating the pigments are soft as determined by measured Tg, while the letdown binder is hard as determined by measured Tg. Further, the letdown hard binder polymer has a relatively small particle size compared to the encapsulated opacifying pigment particle. The compositions of the present invention also provide higher gloss coatings than do compositions of the same combination of opacifying pigment, soft polymer and hard polymer in the same amounts, except absent the opacifying pigment in encapsulated or composite form. For example, coatings made from a zero VOC aqueous composition comprising an opacifier composition wherein the volume ratio of the total opacifying pigment solids to soft polymer 1:3 has shown good coating properties without any coalescent in an 18% PVC formulation. The resulting coatings showed better block resistance and higher Konig hardness than regular higher VOC paints.

The polymers useful as soft polymers or hard binder polymer can be any having the desired measured Tg. Such polymers are formed by conventional polymerization methods known to the ordinary skilled artisan, including aqueous emulsion polymerization of acrylic, styrene, or vinyl polymers in the presence of an initiator or redox catalyst, and one or more surfactants or emulsifiers; known solvent polymerization of isocyanates and active hydrogen compounds to make polyurethanes; known bulk polymerization of lactones, lactams, or polyacids, with polyols and or polyamines to make polyesters or polyamides. Suitable polymers are also commercially available, including organopolysiloxanes which are generally soft polymers.

Acrylic emulsion copolymers suitable as either the hard binder polymer or the soft polymers of the present invention are well known in the art. As is known in the art, the monomer mixture is selected to give a desired calculated Tg which will be approximately the same as the measured Tg. Soft emulsion copolymers comprise the emulsion copolymerization product of a monomer mixture comprising soft vinyl or acrylic monomer, such as any one or more of butyl acrylate, ethyl acrylate, ethylhexyl acrylate, and fatty (meth) acrylates, such as lauryl methacrylate. Hard binder emulsion polymers comprise the emulsion copolymerization product of a monomer mixture comprising hard vinyl or acrylic monomer, such as any one or more of styrene, methyl methacrylate, ethyl methacrylate and (meth)acrylonitrile.

Emulsion copolymers can be stabilized by including in the monomer mixture from 0.1 to 5 wt. %, based on the weight of all monomers used to make the emulsion copolymer, of at least one addition polymerizable carboxylic acid monomer, such as methacrylic acid.

The soft polymer in the opacifier composition (i) of the present invention is preferably an emulsion copolymer, such as an acrylic, a styrene-acrylic, or a vinyl acrylic polymer.

Preferably, the soft polymer includes structural units of styrene or a methacrylate such as methyl methacrylate or ethyl methacrylate; and an acrylate such as ethyl acrylate, butyl acrylate, 2-propylheptyl acrylate, or 2-ethylhexyl acrylate.

The soft monomer mixture which is polymerized to form the soft polymer of the present invention preferably comprises either a) an acrylate monomer and a methacrylate monomer or a styrene monomer, or a combination thereof; b) a methacrylate monomer, an acrylate monomer, and a vinyl acetate monomer; or c) a vinyl acetate monomer and an ethylene monomer.

Emulsion polymer particle sizes can be lowered by using more emulsifier or surfactant, by increasing the shear rate of the polymerization medium, or both, as is known in the art.

Soft polymers suitable for use in accordance with the opacifier compositions (i) of the present invention have a measured Tg below 5° C. or, preferably, below 0° C. and can encapsulate or adsorb onto an opacifying pigment surface. The weight average particle size of the soft polymer may range from 60 to 240 nm, or, preferably, 70 to 150 nm. If the soft polymer particle size is too small, the result would be too thin a soft polymer layer on the opacifying pigment and, thereby, inefficient distribution of encapsulated and composite opacifying pigment particles in the compositions of the present invention. If it is too large, one cannot achieve efficient opacifying pigment coverage, which thereby limits hiding efficiency of compositions and limits their formulation flexibility.

Hard binder copolymers (ii) of the present invention have small weight average particle sizes of 150 nm or below, or, preferably, from 40 to 120 nm, such as from 50 to 100 nm, and have a measured Tg of 30° C. or higher or, preferably, 50° C. or higher.

Opacifying pigments suitable for use in making the opacifier compositions (i) of the present invention comprise particles having a weight average particle size, preferably, of from 150 nm to 500 nm, or, most preferably, from 200 nm to 350 nm. The weight average particle sizes of such opacifying pigments can be measured as defined herein or average diameters of such opacifying pigment particles are provided by pigment particle suppliers. Suitable $TiO_2$ particles have a weight average particle size of around 270 nm.

Suitable opacifying pigments in accordance with the opacifier compositions (i) of the present invention have an index of refraction [nD (20° C.)] that is at least 1.8, preferably, at least 1.9, or more preferably, at least 2.0. The indices of refraction for various materials are listed in *CRC Handbook of Chemistry and Physics*, 80th *Edition*, D. R. Lide, editor, CRC Press, Boca Raton, Fla., 1999, pages 4-139 to 4-146.

Suitable opacifying pigment particles for use in making the opacifier compositions (i) of the present invention include zinc oxide, antimony oxides, zirconium oxide, chromium oxide, iron oxides, lead oxide, zinc sulfide, lithopone, and forms of titanium dioxide, such as anatase and rutile. Preferably, the pigment particles are selected from titanium dioxide and lead oxide. More preferably, the pigment particles are selected from rutile titanium dioxide and anatase titanium dioxide. Most preferably, the pigment particles are rutile titanium dioxide. An opacifier composition containing two different forms of a material, such as rutile and anatase titanium dioxide, is considered to have two different pigments.

The opacifier compositions of the present invention may comprise an at least partially soft polymer encapsulated opacifying pigment, a soft polymer opacifying pigment composite, or their mixture.

Preferably, in the opacifier compositions (i) of the present invention, the opacifying pigments, such as $TiO_2$ particles, are fully encapsulated with the soft polymer of the present invention or are covered by adsorption of soft polymer of the present invention thereto so that they have a shell thickness in the range of from 30 nm, more preferably from 50 nm, to 200 nm, more preferably to 160 nm.

Methods of making the opacifier compositions (i) of the present invention are known to the ordinary skilled artisan. Descriptions of polymer opacifying pigment composites and methods for making them can be found, for example, in U.S. Pat. Nos. 5,509,960; 6,080,802; 7,265,166; and 7,081,488. Examples of commercially available polymer opacifying pigment composites include EVOQUE™ Precomposite Polymers (The Dow Chemical Company, Midland, Mich.). Examples of at least partially polymer encapsulated opacifying pigments are disclosed, for example, in U.S. Pat. Pub. 2003/0018103A1. Examples of polymer encapsulated opacifying pigment or $TiO_2$ particles are described in U.S. Pat. No. 4,421,660; U.S. Pat. Pub. 2010/0298483, to Allen et al., in EP2161304 (A1) and in EP1802662 (B1).

A preferred general process for fully encapsulating opacifying pigment particles in a polymer comprises (a) forming a mixture of i) an aqueous dispersion of opacifying pigment particles, e.g. $TiO_2$, and an amphoteric polymer, such as one having sulfur acid and amine functional groups; ii) an anionic surfactant; and iii) sodium styrene sulfonate; (b) adding to the mixture in (a) a redox initiator system; then (c) adding an aqueous dispersion of one or more ethylenically unsaturated monomer, such as an acrylic or vinyl monomer that when polymerized will form a soft polymer having the desired measured Tg; and (d) polymerizing the one or more monomer in (c) to form an aqueous dispersion of a soft polymer encapsulated opacifying pigment particles.

It may be further desirable to include any of the following after (d): (e) adding to the dispersion in (d) a second aqueous dispersion of one or more monomer, which preferably comprises a methacrylate or a styrene monomer, or a combination thereof, and an acrylate monomer; and (f) polymerizing the one or more monomer from (e) to form an aqueous dispersion of a second polymer that at least partially encapsulates the first polymer.

The amphoteric polymer in the aqueous opacifying pigment dispersion of (a)(i) in the above process, is a polymeric dispersant for the opacifying pigment particles that contains amine functionality and acid functionality.

Preferably, the amphoteric polymer is prepared from the copolymerization of an ethylenically unsaturated amine functional monomer and an ethylenically unsaturated sulfur-acid functional monomer. Examples of suitable ethylenically unsaturated amine functional monomers include dimethylaminoethyl methacrylate, dimethylaminoethyl acrylate, dimethylaminopropyl methacrylamide, dimethylaminopropyl acrylamide, i-butylaminoethyl methacrylate and i-butylaminoethyl methacrylate, preferably, dimethylaminoethyl methacrylate (DMAEMA). Examples of suitable ethylenically unsaturated sulfur-acid functional monomers include sulfoethyl methacrylate, sulfoethyl acrylate, sulfopropyl methacrylate, sulfopropyl acrylate, styrene sulfonic acid, vinyl sulfonic acid, 2-methacrylamido-2-methyl propanesulfonic acid, and 2-acrylamido-2-methyl propanesulfonic acid, and salts thereof, preferably, 2-acrylamido-2-methyl propanesulfonic acid or sulfoethyl methacrylate.

Suitable anionic surfactants include sodium dodecylbenzene sulfonate (SDS), dodecyl allyl sulfosuccinate or sodium laureth sulfate.

As used herein, the term "sulfur acid-functional monomer" is meant to include any monomer containing at least one free radical polymerizable vinyl group, and at least one sulfur acid moiety. As used herein, the term "sulfur acid moiety" is meant to include any of the following residues: —$S(O)_2(OH)$, —$OS(O)_2(OH)$, —$OS(O)(OH)$, —$S(O)(OH)$. Also included in the definition of term "sulfur acid moiety" are salts of the above residues. As used herein, the term "water-soluble sulfur acid functional first polymer" means that the sulfur acid-functional first polymer is soluble in water at 25° C. at a pH of less than or equal to 5 to an extent of at least 5% by weight. The sulfur acid-functional first polymer can be any of a polymer with at least three sulfur acid moieties.

As used herein, the term "redox initiator system" refers to a combination of a reducing agent, an oxidizing agent, and a metal ion catalyst. Examples of suitable oxidizing agents include persulfates such as ammonium and alkali metal persulfates; hydroperoxides, such as i-butyl hydroperoxide and cumene hydroperoxide; peroxides such as benzoyl peroxide, caprylyl peroxide, and di-i-butyl peroxide; peresters such as i-butyl peracetate, i-butyl perphthalate, and i-butyl perbenzoate; percarbonates; and perphosphates. Examples of suitable reducing agents include ascorbic acid, isoascorbic acid, malic acid, glycolic acid, oxalic acid, lactic acid, and thioglycolic acid; an alkali metal hydrosulfite such as sodium hydrosulfite; a hyposulfite such as potassium hyposulfite; or a metabisulfite such as potassium metabisulfite; and sodium formaldehyde sulfoxylate. Suitable accelerators include halide and sulfate salts of cobalt, iron, nickel, and copper, used in small amounts. An example of a preferred redox initiator system is i-butyl hydroperoxide/isoascorbic acid/$Fe^{+2}$.

Preferably, the accelerator is added prior to the addition of the oxidizing and reducing agents. It is further preferred that the oxidizing and reducing agents are added over time to maintain a relatively even level of radical flux over the course of the addition of monomers.

In any case where an aqueous pigment dispersion is formed, the dispersion is advantageously prepared by slowly adding, with concomitant grinding, the opacifying pigment to an aqueous dispersion of the pigment dispersant polymer. The preferred solids content of the aqueous opacifying pigment dispersion is in the range of 70 to 80 wt. % based on the weight of opacifying pigment, polymer dispersant, and water.

In a variant of the above process for forming a polymer encapsulated opacifying pigment suitable as the opacifier composition (i) of the present invention, the opacifying pigment particle has a weight average particle diameter of from 0.005 to 5 microns and is dispersed in an aqueous medium with from 0.1% to 25% by weight, based on the weight of said pigment particle, water-soluble sulfur acid functional polymer. The soft polymer is formed by emulsion polymerizing a suitable monomer mixture in the presence of the dispersed pigment particle and, preferably, an anionic surfactant, to provide from 10% to 200%, by weight, based on the weight of said pigment particle, of a soft polymer that at least partially encapsulates the dispersed pigment particle. The sulfur acid functional polymer is, preferably, amphoteric and is prepared from the copolymerization of an ethylenically unsaturated amine functional monomer and an ethylenically unsaturated sulfur-acid functional monomer, such as those listed above.

Yet another process for making a polymer encapsulated opacifying pigment suitable as the opacifier composition (i) of the present invention comprises mixing from 1 wt. % to 90 wt. %, preferably, from 10 to 75 wt. %, or, more preferably, from 20 to 60 wt. %, based on total solids of opacifying pigment plus soft polymer, of one or more opacifying pigment, with one or more soft polymer in the form of an emulsion copolymer in the presence of from 0 to 3.0 wt. %, preferably, 1.0 wt. % or less, based on total solids, of a passivating agent, for example, a multivalent metal or compound, salt or hydroxide, such as $Ca(OH)_2$, to form a moist mixture having a total solids content of 60 wt. % or more, followed by drying the moist mixture to form granular polymer encapsulated opacifying pigment particles. In such methods, no added water is present other than the water from the emulsion copolymer(s), thereby enabling the production of fluidizable polymer encapsulated opacifying pigment particles after a short dry time. The moist mixture can be dried quickly at ambient or elevated temperature, preferably, in a fluid bed dryer or in a cement mixer.

In a process suitable for forming the polymer opacifying pigment composite of the present invention, a soft polymer which has already been formed by emulsion polymerization is mixed with an aqueous pigment dispersion wherein the pigment is stabilized against homocoagulation, such as with an anionic surfactant or an anionic pigment dispersant, for example, a polyacrylic acid or salt dispersant, and, further wherein, the soft polymer and the pigment dispersion have the same surface charge and the soft polymer has a higher ionic charge density or zeta potential than the pigment dispersion, whereby the soft polymer adsorbs onto the pigment. In such a process to make the polymer opacifying pigment composite of the present invention the zeta potential of the soft polymer in the aqueous medium ranges from −20 mV, or, preferably, at least −40 mV, and is greater in absolute value (that is, more negative) than the zeta potential of the opacifying pigment, e.g. titanium dioxide particles in the aqueous medium.

Where the polymer opacifying pigment composite comprises a soft polymer that itself contains one or more phosp, the hard binder polymer is free of polymerization residues of strong acids, such as sulfur-acid monomers or phosphorus acid-monomers.

As used herein, the term "zeta potential" means the value in mV measured by electrophoresis, in which the movement of individual particles of a given pigment dispersion, polymer dispersion or emulsion polymer under the influence of an external electric field is observed, either directly, by a light microscope, or indirectly. The particle velocities or mobilities measured are then used to calculate the zeta potential. As measurements must be made at low concentrations (for example, at 0.1% w/w or less), samples often must be substantially diluted with an appropriate diluent, such as a standard reference solution, or an aliquot of the sample's own continuous phase ("serum") obtained by filtration, centrifugation, or another method. See, for example, R. J. Hunter, *Zeta Potential in Colloid Science* (Academic Press, 1981).

Preferably, the absolute value of the zeta potential of the soft polymer particles is at least about 20 mV and more preferably at least about 40 mV, while the absolute value of the zeta potential of the opacifying pigment particles is at least about 5 mV and more preferably at least about 20 mV.

Preferably, the zeta potential or charge density of the opacifying pigment in the aqueous pigment dispersion useful to make a polymer opacifying pigment composite in accordance with the present invention is adjusted with a combination of one or more nonionic colloidal stabilizers, such as polyvinyl alcohol or hydroxyethyl cellulose, to limit the surface charge of the pigment, and one or more anionic dispersants or surfactants as needed to develop the zeta potential or charge density of the pigment dispersion. For example, in the aqueous pigment dispersion, the ratio of nonionic colloidal stabilizer solids, by weight, to total anionic dispersant or surfactant solids, by weight, may range from 1:10 to 20:1 as needed to adjust charge density accordingly.

Suitable soft polymers having a sufficient zeta potential or charge density to adsorb onto an opacifying pigment to make polymer opacifying pigment composites in accordance with the present invention may be formed from a monomer mixture including from 0.5 to 5 wt. %, based on the total weight of monomers used to make the soft polymer, of at least one of a phosphorus acid monomer, phosphorus acid full-ester group containing monomer, monomer containing polyacid sidechain groups, e.g. a polyacrylic acid ester of a hydroxyalkyl (meth)acrylate, or mixtures thereof.

Suitable phosphorus acid monomers include dihydrogen phosphate-functional monomers such as dihydrogen phosphate esters of an alcohol in which the alcohol also contains a polymerizable vinyl or olefinic group, such as allyl phosphate, mono- or diphosphate of bis(hydroxy-methyl)fumarate or itaconate, derivatives of (meth)acrylic acid esters, such as, for example, phosphates of hydroxyalkyl (meth) acrylates including 2-hydroxyethyl(meth)acrylate, 3-hydroxypropyl (meth)acrylates, and the like. Other suitable phosphorus acid monomers are phosphonate functional monomers, such as are disclosed in WO 99/25780 A1, and include vinyl phosphonic acid, allyl phosphonic acid, 2-acrylamido-2-methylpropanephosphonic acid, a-phosphonostyrene, 2-methylacrylamido-2-methylpropanephosphonic acid. Further suitable phosphorus acid monomers are 1,2-ethylenically unsaturated (hydroxy) phosphinylalkyl (meth)acrylate monomers, such as are disclosed in U.S. Pat. No. 4,733,005, and include (hydroxy)phosphinylmethyl methacrylate. Other suitable phosphorus acid monomers are dihydrogen phosphate monomers, which include 2-phosphoethyl(meth)acrylate, 2-phosphopropyl(meth) acrylate, 3-phosphopropyl(meth)acrylate, and 3-phospho-2-hydroxypropyl (meth)acrylate.

Preferably, in making the polymer opacifying pigment composite the soft polymer is formed by emulsion polymerizing a monomer mixture comprising from 0.5 to 5 wt. %, based on the total weight of monomers used to make the soft polymer of at least one phosphorus acid functional monomer, such as the dihydrogen phosphate ester of an alcohol in which the alcohol contains a polymerizable vinyl or olefinic group; examples include allyl phosphate, alkyl glycol ether phosphate, hydroxyethyl methacrylate phosphate, the mono- or di-phosphate of bis(hydroxyethyl) fumarate or itaconate. More preferably, the phosphorus acid monomer is the dihydrogen phosphate ester of 2-hydroxyethyl methacrylate.

In the methods of making the polymer opacifying pigment composites of the present invention, the aqueous pigment dispersion may further comprise up to 5 wt. %, based on total pigment dispersion solids, of a coupling agent like an amino-functional alkoxysilane.

The composition of the present invention is useful as a coating, an adhesive, or a sealant for a suitable substrate or primed include metal, plastic, concrete, wood, asphalt, hair, paper, leather, rubber, foam, or textiles.

EXAMPLES

The following examples are for illustrative purposes only and are not intended to limit the scope of the invention.

Abbreviations (except as further noted, below): SDS=Sodium dodecylbenzene sulfonate (23 wt. %); BA=Butyl acrylate; SSS=Sodium styrene sulfonate; EHA=Ethylhexyl acrylate; MMA=Methyl methacrylate; BHP=i-Butyl hydroperoxide; MAA=Glacial methacrylic acid; EDTA=Ethylene diamine tetraacetic acid; ALMA=Allyl methacrylate; IAA=Isoascorbic acid; DI=Deionized; PEM=Phosphoethyl methacrylate (65 wt. % active); AAEM=Acetoacetoxyethyl methacrylate; AA=Acrylic Acid; AN=Acrylonitrile; P-acid=phosphorus acid group containing.

The soft polymers 1 and 2 presented in Table 1, below, and the hard polymers presented in Table 2, below were used to make polymer opacifying pigment composites in accordance with the present invention. The soft polymers 3 and 4 presented in Table 1, below are comparatives. The polymer 1B presented in Table 3, below, is a soft/hard two-stage acrylic polymer.

TABLE 1

Soft Polymers For Making Polymer Opacifying Pigment Composites

| Example | Composition | Solids | pH | PS (nm) | Tg (° C.) |
|---|---|---|---|---|---|
| Soft Polymer 1 | 63 EHA/33.8 MMA/3.2 PEM | 42.8% | 9.46 | 74.8 | −20 |
| Soft Polymer 2 | 63 EHA/33.8 MMA/3.2 PEM | 42.9% | 9.53 | 108.8 | −21 |
| Soft Polymer 3 | 63 EHA/35 MMA/2.0 AA | 42.5% | 9.36 | 71.5 | −19 |
| Soft Polymer 4 | 63 EHA/35 MMA/2.0 AA | 42.9% | 9.39 | 111.6 | −19 |

TABLE 2

Hard Polymers

| Example | Composition | Solids | pH | PS (nm) | Tg (° C.) |
|---|---|---|---|---|---|
| Hard Polymer 1[1] | Styrene/EHA/MMA/MAA | 45% | 7.5 | 80 | 35 |
| Hard Polymer 2[2] | Styrene/EHA/AN/MAA | 41.5% | 7.6 | 80 | 52 |

[1]Aqueous styrene-acrylic emulsion polymer with 5 wt. % or less copolymerized acid mer content;
[2]Aqueous styrene-acrylic emulsion polymer with 5 wt. % or less copolymerized acid mer content.

TABLE 3

Soft/Hard Two Stage Comparative Binder Polymer

| Example | Composition | % T.S. | pH | PS (nm) |
|---|---|---|---|---|
| Polymer 1B [1] | Styrene/EHA/MMA/AAEM/PEM | 50-51% | 8.50-9.50 | 120-150 |

[1] Aqueous acrylic two-stage emulsion polymer with 60% polymerization stage comprising of Styrene/EHA/MMA/AAEM/PEM (calculated Tg = 11° C.), and 40% polymerization stage comprising of Styrene/EHA/MMA/AAEM/PEM (calculated Tg = 35° C.). Tgs of the polymers are calculated so that for calculating the Tg of a copolymer of monomers M1 and M2, the calculated Tg = w (M1) x Tg(M1) + w(M2) x Tg(M2) wherein the calculated Tg is the glass transition temperature calculated for the copolymer, w(M1) is the weight fraction of monomer M1 in the copolymer, w(M2) is the weight fraction of monomer M2 in the copolymer, Tg(M1) is the glass transition temperature of the homopolymer of M1, Tg(M2) is the glass transition temperature of the homopolymer of M2, all temperatures being in Kelvin and then converted after calculation to ° C.

Soft Polymer 1 Synthesis Example

To 1350 g of deionized (DI) water under a nitrogen atmosphere at 87° C. was added 35.5 g of anionic surfactant A (31 wt. % active ethoxylated (EO) alkyl ether sulfate $C_{12-14}$ with, sodium salt, CAS-NO. 68891-38-3; from BASF as in Example 1 of EP publication EP2426166 A2), 45 g DI water, 60.5 g of monomer mixture 1, 6.5 g of ammonium persulfate dissolved in 50 g DI water to form a reaction mixture. The remaining monomer mix 1, shown in the Table, below, was added over 110 minutes along with a solution of 2.8 g ammonium persulfate dissolved in 75 g DI water. At the end of the polymerization, 19.8 g of 30% ammonium hydroxide solution, 0.01 g $FeSO_4$ in 10 g DI water, 0.02 g of EDTA in 1.5 g of DI water, 2.1 of t-butylhydroperoxide dissolved in 40 g of DI water, and 1.5 g of isoascorbic acid dissolved in 40 g of DI water were added. An additional 34.2 g of 30% ammonium hydroxide was added to raise the pH to 9.46. The resulting soft polymer 1 had a solids content of 42.3% and a particle size of 75 nm.

TABLE

Monomer Mixture 1

| ingredient | grams |
|---|---|
| DI water | 450.00 |
| Anionic surfactant A (31% active) | 36.50 |
| 2-ethylhexyl acrylate | 1071.00 |
| Methyl methacrylate | 574.60 |
| Phosphoethyl methacrylate | 34 |

Soft Polymer 2 Synthesis Example

Was prepared as in the soft polymer 1 synthesis example, except the amount of Fes 32 added to the reaction mixture was 3.6 g. Monomer mixture 2 is shown in the Table, below. The resulting polymer had a solids content and a particle size as shown in Table 1, above.

TABLE

Monomer Mixture 2

| Ingredient | grams |
|---|---|
| DI water | 450.00 |
| Anionic surfactant A (31% active) | 68.4 |
| 2-ethylhexyl acrylate | 1071.00 |
| Methyl methacrylate | 574.60 |
| Phosphoethyl methacrylate | 34 |

Soft Polymer 3 Synthesis Example

To 1350 g of deionized (DI) water under a nitrogen atmosphere at 87° C. was added 35.5 g of Anionic surfactant A (31% active), 45 g DI water, 60.5 g of monomer mixture 3, 6.5 g of ammonium persulfate dissolved in 50 g DI water to form a reaction mixture. The remaining monomer mix 3, shown in the Table, below, was added over 110 minutes along with a solution of 2.8 g ammonium persulfate dissolved in 75 g DI water. At the end of the polymerization, 19.8 g of 30% ammonium hydroxide solution, 0.01 g $FeSO_4$ in 10 g DI water, 0.02 g of EDTA in 1.5 g of DI water, 2.1 of t-butylhydroperoxide dissolved in 40 g of DI water, and 1.5 g of isoascorbic acid dissolved in 40 g of DI water were added. An additional 15 g of 30% ammonium hydroxide was added to raise the pH to 9.36. The resulting polymer had a solids content and a particle size as shown in Table 1, above.

TABLE

Monomer mixture 3

| Ingredient | grams |
|---|---|
| DI water | 450.00 |
| Anionic surfactant A (31% active) | 36.50 |
| 2-ethylhexyl acrylate | 1071.00 |

TABLE-continued

Monomer mixture 3

| Ingredient | grams |
|---|---|
| Methyl methacrylate | 595 |
| acrylic acid | 34 |

Soft Polymer 4 Synthesis Example

The soft polymer 4 was prepared in a similar manner to the soft polymer 3, except that the amount of Fes 32 added to the reaction mixture was 3.6 g. The monomer mixture 4 is shown in the Table, below. The resulting polymer had a solids content and a particle size as shown in Table 1, above.

TABLE

Monomer Mixture 4

| Ingredient | grams |
|---|---|
| DI water | 450.00 |
| Anionic surfactant A (31% active) | 68.40 |
| 2-ethylhexyl acrylate | 1071.00 |
| Methyl methacrylate | 595 |
| Acrylic acid | 34 |

As shown in Tables 4 and 5, below, the indicated polymers as disclosed in the Tables, above, are formulated into Inventive and Comparative coating formulations by letting the ingredients down in the indicated binder polymer. To make the coating formulation in Table 4, below, an IKA RW 16 basic overhead stirrer (IKA Works, Inc., Wilmington, N.C.) was used. The binder polymer, water and BYK-028 defoamer were combined using the overhead stirrer. TiPure™ R-746 rutile titanium dioxide (DuPont, Wilmington, Del.) slurry was added into the polymer emulsion mixture while stirring using the overhead stirrer and stirred for 10 min. The coalescent, sodium nitrite (15% w/w in water), ACRYSOL™ RM-2020NPR rheology modifier, and ACRYSOL™ RM-8W rheology modifier were added in sequence under stirring. To make the coating formulation in Table 5, below, the binder polymer, water and defoamer were combined under agitation using an IKA RW 16 basic overhead stirrer and TiO$_2$ (TiPure™ R-746, DuPont) rutile titanium dioxide slurry in the amount needed to give the indicated % OPVC in Table 5 was added into the polymer emulsion mixture while stirring using the overhead stirrer and stirred for 10 min. The hard polymer, sodium nitrite (15% w/w in water), ACRYSOL™ RM-2020NPR rheology modifier, and ACRYSOL™ RM-8W rheology modifier were subsequently added under stirring. In the coating formulations of Table 5, a plurality of the indicated soft polymer particles adsorbed onto a TiO$_2$ particle to make a polymer opacifying pigment composite.

TABLE 4

Coating Formulation For The Comparative Polymer Binder Example 19C

| Material Name | weight (lb) |
|---|---|
| Polymer 1B (two-stage soft-hard binder polymer) | 50.12 |
| Aqua ammonia 15% w/w | 0.25 |
| BYK-028 Defoamer[1] (Mixture of polysiloxane and hydrophobic solids in polyglycol) | 0.10 |
| TiPure ™, [2] R-746 Rutile titanium dioxide slurry (76.5 w/w % in water) | 26.99 |
| Texanol ™, [3] ester alcohol (2,2,4-trimethyl-1,3-pentanediol mono(2-methylpropanoate) | 0.76 |
| Dowanol ™, [4] DPM (Dipropylene glycol monomethyl ether) | 2.28 |
| Sodium Nitrite (15% w/w in water) | 0.89 |
| ACRYSOL ™, [4] RM -2020NPR Rheology Modifier, hydrophobically modified ethylene oxide urethane (HEUR) polymers | 0.75 |
| ACRYSOL ™, [4] RM -8W Rheology Modifier, hydrophobically modified ethylene oxide urethane (HEUR) polymers | 0.16 |
| Water | 17.71 |
| Total | 100 |
| Total % OPVC | 18 |
| Volume Solids | 35 |
| Weight Solids | 46 |
| VOC Generic Water Excl. | 95/l |

[1] BYK-Chemie GmbH, Germany
[2] Rutile Titanium Dioxide Slurry (weight average particle size 285 nm, DuPont, Wilmington, DE);
[3] Eastman Chemicals, Kingsport TN;
[4] The Dow Chemical Company, Midland, MI.

TABLE 5

Coating Formulations

| Material or Property | Example | | | | | | | |
|---|---|---|---|---|---|---|---|---|
| | 1 | 2 | 3C | 4C | 5 | 6 | 7C | 8C |
| % OPVC | 18 | 18 | 18 | 18 | 18 | 18 | 18 | 18 |
| % Volume Solids | 35 | 35 | 35 | 35 | 35 | 35 | 35 | 35 |
| % Weight Solids | 47 | 47 | 47 | 47 | 47 | 47 | 47 | 47 |
| VOC Generic (g/l) (Excl. Water) | 0 | 0 | 0 | 0 | 0 | 0 | 0 | 0 |
| Soft Polymer 1 | 35.76 | | | | 35.71 | | | |
| Soft Polymer 2 | | 35.68 | | | | 35.65 | | |
| Soft Polymer 3 | | | 36.01 | | | | 35.87 | |
| Soft Polymer 4 | | | | 35.68 | | | | 35.56 |
| TiO$_2$ | 26.67 | 26.68 | 26.67 | 26.68 | 26.64 | 26.66 | 26.58 | 26.59 |
| Hard Polymer 1 | 23.49 | 23.49 | 23.49 | 23.49 | | | | |
| Hard Polymer 2 | | | | | 25.61 | 25.62 | 25.54 | 25.55 |
| Defoamer | 0.10 | 0.10 | 0.10 | 0.10 | 0.10 | 0.10 | 0.10 | 0.10 |

TABLE 5-continued

Coating Formulations

| Material or Property | Example | | | | | | | |
|---|---|---|---|---|---|---|---|---|
| | 1 | 2 | 3C | 4C | 5 | 6 | 7C | 8C |
| Sodium Nitrite (15% w/w in water) | 0.88 | 0.88 | 0.88 | 0.88 | 0.93 | 0.88 | 0.98 | 0.90 |
| Acrysol ™ RM-2020 NPR Rheology Modifier | 0.71 | 0.71 | 0.70 | 0.71 | 0.79 | 0.80 | 0.79 | 0.79 |
| Acrysol ™ RM-8W Rheology Modifier | 0.20 | 0.20 | 0.20 | 0.20 | 0.27 | 0.24 | 0.44 | 0.49 |
| Water | 12.20 | 12.27 | 11.96 | 12.27 | 9.95 | 10.05 | 9.73 | 10.02 |
| Total | 100 | 100 | 100 | 100 | 100 | 100 | 100 | 100 |

The resulting aqueous coating compositions were made into coatings on chromate pre-treated aluminum panels using a 254 micron polytetrafluoroethylene latex film applicator, and allowed to dry in a controlled temperature room (CTR) having a set temperature of 22° C., 50% relative humidity (RH) and a pressure of 1 atm (atmospheric pressure). The resulting coatings were tested as follows:

Test Methods:

Gloss:

Gloss at the indicated angle was measured using micro-TRI-gloss meter from BYK Gardner (BYK-Gardner GmbH, Germany) after 1 day (24 hr) of drying the indicated coating in the CTR. Each value reported herein is the average of three measurements on different positions of the same coating on the same date.

Hardness:

Pendulum (König) hardness was measured on the indicated coatings according to ASTM D4366-95 (1995) using a TQC SP0500 Pendulum Hardness Tester (TQC-USA Inc., Metamora, Mich.). The films were dried in a CTR for 1 day and 7 days before the pendulum hardness measurements. The results were reported in seconds. A higher number means higher pendulum hardness.

Block Resistance:

This was measured after drying 1 day or 7 days in the controlled temperature room (CTR), pairs of 3.81 cm squares were cut from each coating, placed face-to-face and tested in one of two ways: a) overnight at room temperature in the CTR and b) ½ h in a 50° C. oven. In each test, a #8 stopper and 1 kilogram weight were placed on top of the squares. The ratings are based on the ease of separating the squares from each other and the damage on the coated surface after the separation. The ratings range from 0 to 10 with 0 being the worst, where the squares cannot be separated without completely damaging them film; and 10 being the best, where the squares can be separated without any force after the 1 kg weight is removed. A block resistance value of 6 or higher is acceptable.

Minimum Film Formation Temperature (MFFT):

The MFFT of a given material was determined using a Rhopoint MFFT instrument (Rhopoint Instruments, UK). A 2.54 cm (one inch) cube Sheen Film Applicator with a gap size of 381 microns (15 mils) was used to drawdown films on Scotch™ tape (3M, Minneapolis, Minn.) placed over a temperature gradient plate. The visual MFFT was determined as the lowest temperature at which there is no visual cracking and/or powdery appearance of film. The mechanical MFFT was determined as the temperature at which the continuous cracking of the film starts when slowly pulling the tape perpendicularly to the plate from the high temperature end.

TABLE 6A

Coating Performance

| Example | Formulation | | % OPVC | VOC | MFFT (visual/ mechanical) (° C.) |
|---|---|---|---|---|---|
| 19C | Polymer 1B | Soft-hard 2-stage | 18 | 94 | <0/5.7 |
| 1 | Hard Polymer 1 | P-acid | 18 | 0 | <0/7 |
| 2 | Hard Polymer 1 | P-acid | 18 | 0 | <0/7.6 |
| 3C | Hard Polymer 1 | Non P-acid | 18 | 0 | <0/8.2 |
| 4C | Hard Polymer 1 | Non P-acid | 18 | 0 | <0/5.6 |

TABLE 6B

Coating Performance

| Example | König Hardness, 1 day | König Hardness, 7 day | RT block, 1 day | Hot block, 1 day | RT block, 7 day | Hot Block, 7 day | 20° Gloss | 60° Gloss |
|---|---|---|---|---|---|---|---|---|
| 19C | 10.0 | 18.6 | 3 | 2 | 8 | 3 | 69 | 84 |
| 1 | 11.4 | 15.6 | 6 | 3 | 8 | 4 | 53 | 80 |
| 2 | 12.9 | 17.0 | 6 | 2 | 8 | 3 | 58 | 80 |
| 3C | 14.3 | 16.9 | 7 | 3 | 8 | 3 | 37 | 72 |
| 4C | 14.3 | 17.7 | 7 | 2 | 8 | 3 | 31 | 69 |

As shown in Tables 6A and 6B, above, a two-stage binder with soft and hard polymer stages was chosen for comparative Example 19C. However, this polymer (polymer 1B) requires a relatively high level of coalescent to formulate, around 100 g/L. The inventors were able to achieve similar or better performance at zero VOC. Both of the inventive Examples 1 and 2 containing polymer opacifying pigment composites with hard binder polymers showed dramatically improved early room temperature block resistance (1 day after coating) and from a 14% (Example 1) to a 29% (Example 2) improvement in 1 day (early) König hardness. Examples 3C and 4C contain the same amount of soft polymer, opacifying pigment, and hard polymer as Examples 1 and 2, but the soft polymers did not absorb onto $TiO_2$ particles to form composite. The resulting paints had much lower gloss compared to Examples 1 and 2 that contain polymer opacifying pigment composites. The Comparative composition contained the same amount of opacifying pigment as the inventive compositions and the same overall amount of one polymer having a soft stage and a hard stage (SHE polymer).

TABLE 6C

Coating Performance

| Example | Polymer | | % OPVC | VOC | MFFT (visual/ mechan- ical) (° C.) |
|---|---|---|---|---|---|
| 19C | Polymer 1B | 2-stage | 18 | 94 | <0/5.7 |
| 5 | Hard Polymer 2 | P-acid | 18 | 0 | <0/2.0 |
| 6 | Hard Polymer 2 | P-acid | 18 | 0 | <0/2.6 |
| 7C | Hard Polymer 2 | Non P-acid | 18 | 0 | <0/1.0 |
| 8C | Hard Polymer 2 | Non P-acid | 18 | 0 | <0/<0 |

TABLE 6D

Coating Performance

| Example | König Hard- ness, 1 day | König Hard- ness, 7 day | RT block, 1 day | Hot block, 1 day | RT block, 7 day | Hot Block, 7 day | 20° Gloss | 60° Gloss |
|---|---|---|---|---|---|---|---|---|
| 19C | 10.0 | 18.6 | 3 | 2 | 8 | 3 | 69 | 84 |
| 5 | 15.8 | 20.0 | 8 | 7 | 9 | 8 | 39 | 71 |
| 6 | 17.2 | 21.4 | 9 | 7 | 9 | 8 | 31 | 66 |
| 7C | 17.2 | 21.5 | 8 | 7 | 9 | 8 | 14 | 54 |
| 8C | 15.7 | 20.0 | 9 | 5 | 9 | 8 | 16 | 55 |

As shown in Tables 6C and 6D, above, both of the inventive Examples 5 and 6 containing polymer opacifying pigment composites with hard binder polymers showed dramatically improved early room temperature and hot block resistance (1 day after coating) and from 58% (Example 5) to 72% (Example 6) improvements in 1 day (early) König hardness. Examples 7C and 8C contain the same amount of soft polymer, opacifying pigment, and hard polymer as Examples 5 and 6, but the soft polymers did not absorb onto the $TiO_2$ particles to form composites. The resulting paints have much lower gloss compared to inventive Examples 5 and 6 that contain polymer opacifying pigment composites. The comparative compositions contained the same amount of the same amount of opacifying pigment as the inventive compositions (Examples 5-6). The inventive compositions contained a preferred hard binder polymer having a measured Tg of 52° C.

Synthesis Example 5: Preparation of Polymer Encapsulated $TiO_2$ Particles

To a 5-liter four-necked round bottom flask equipped with paddle stirrer, $N_2$-inlet, reflux condenser, heating mantel, and thermocouple was charged 1972.5 g of a $TiO_2$ (weight average particle size of 285 nm) amphoteric polymer slurry (prepared essentially as described in U.S. Pat. Pub. 2010/0298483A1, Example 1; 73 wt. % solids). The mixture was heated to 50° C. while purged with $N_2$, and to the flask was sequentially added each of a solution of SDS (15 g) mixed in DI water (36.5 g), a solution of SSS (12 g in 45.5 g DI water), an aqueous solution of 0.15 wt. % aqueous iron(II) sulfate solution (25.5 g), and a 1 wt. % aqueous EDTA solution (0.98 g). Co-feed #1 (15 g BHP dissolved in 204 g DI water) and co-feed #2 (8.4 g IAA dissolved in 204 g DI water) were fed to the flask at a rate of 2 g/min. Two minutes after the onset of the co-feed additions, a monomer emulsion (ME, prepared by mixing DI water (237.8 g), SDS (27.8 g), EHA (594.8 g), MMA (456.8 g), and MAA (10.5 g)) was fed to the reactor at a rate of 17.7 g/min and allow the flask temperature to exotherm to 68° C. After the ME addition was complete, the monomer emulsion vessel was rinsed with 54.8 g deionized water into the flask. The co-feed additions were continued for another 25 min until completion. When the flask was then cooled to 45° C., aqua ammonia (14.3 g, 28% w/w) was added. After cooling to room temperature, the contents were filtered to remove any gel. The filtered dispersion was found to have a solids content of 60.1% and 27 ppm of dry gel.

The Polymer encapsulated opacifying pigments 9-11, shown in Table 7, below, were synthesized using the method as described in Synthesis Example 5 above. The EHA vs. MMA ratio and $TiO_2$ to monomer ratio were varied according to Table 7.

TABLE 7

Polymer Encapsulated Opacifying Pigments

| Example | Soft Polymer Shell Composition | $TiO_2$ to soft polymer Shell volume ratio | $Tg^1$ (° C.) | Particle $Size^2$ (nm) | % T.S. | pH |
|---|---|---|---|---|---|---|
| 9 | 56 2-EHA/43 MMA/1 MAA | 1:3 | −2.7 | 454 | 60.1 | 8.8 |

TABLE 7-continued

Polymer Encapsulated Opacifying Pigments

| Example | Soft Polymer Shell Composition | TiO$_2$ to soft polymer Shell volume ratio | Tg[1] (° C.) | Particle Size[2] (nm) | % T.S. | pH |
|---|---|---|---|---|---|---|
| 10 | 63 2-EHA/36 MMA/1 MAA | 1:3 | −15.8 | 459 | 60.1 | 8.8 |
| 11 | 56 2-EHA/43 MMA/1 MAA | 1:2 | −1.7 | 409 | 61.4 | 8.6 |
| 12 | 63 2-EHA/36 MMA/1 MAA | 1:2 | −15.5 | 414 | 61.2 | 8.6 |

[1]Measured Tg;
[2]Particle sizes were determined using the weight average particle size of TiO$_2$ (285 nm) and the volume ratio of TiO$_2$ to soft polymer encapsulant, assuming that all particles are spherical and assuming uniform shell thickness.

Synthesis Example 6: Preparation of Control Soft Polymers

To a 5-L four-necked round bottom flask equipped with paddle stirrer, N$_2$-inlet, reflux condenser, heating mantel, and thermocouple was charged 400 g of DI water. The content of the flask was heated to 50° C. while purged with N2, and to the flask was sequentially added a solution of sodium bicarbonate (3.3 g in 25 g DI water), 91.5 g of a 44.5% solids content polymer preformed emulsion with a 100 nm particle size, and a aqueous solution of 0.15% iron(II) sulfate solution (38 g). Co-feed #1 (22.6 g BHP dissolved in 215 g DI water) and co-feed #2 (12.7 g IAA dissolved in 2354 g DI water) were fed to the flask at a rate of 1.6 g/min. Two minutes after the onset of the co-feed solution addition, a monomer emulsion (ME, prepared by mixing DI water (250 g), SDS (63.7 g 23% solution), EHA (912.1 g), MMA (700.4 g), and MAA (16.3 g)) was fed to the reactor at a rate of 8.8 g/min. 10 minutes after the start of monomer emulsion fed, the feed rate was increased to 17.7 g/min, the flask temperature was allowed to exotherm to 68° C. After the ME addition was complete, the monomer emulsion vessel was rinsed with 30 g deionized water into the flask. The co-feed additions were continued for another 25 min until completion and the flask was let cool. When the flask was cooled to 30° C., 4.6 g aqua ammonia (28% w/w) was added dropwise. After cooling to room temperature, the contents were filtered to remove any gel. The filtered dispersion was found to have a particle size of 319 nm, solids content of 55.4%, pH of 8.58, and 10 ppm of dry gel.

The control polymer 2C and 3C, shown in Table 8, below, were synthesized using the methods described in Synthesis Example 6 above. The EHA vs. MMA ratios were varied according to Table 8.

TABLE 8

Control Soft Polymers

| Example | Composition | Tg (° C.) | Particle Size (nm) | % T.S. | pH |
|---|---|---|---|---|---|
| Polymer 2C | 56 2-EHA/43 MMA/1 MAA | −2.5 | 319 | 55.4 | 8.5 |
| Polymer 3C | 63 2-EHA/36 MMA/1 MAA | −10.7 | 320 | 55.2 | 8.5 |

The polymer 1E shown in Table 9, below, was synthesized by conventional emulsion polymerization as in Example A1 of U.S. Pat. No. 8,653,180 B2.

TABLE 9

Hard Binder Polymers

| Example | Composition | Measured Tg (° C.) | Particle Size (nm) | % T.S. | pH |
|---|---|---|---|---|---|
| Polymer 1E | Styrene/EHA/MMA/AAEM/PEM | 35 | 75 | 45.4 | 9.4 |

As shown in Tables 10, 11, and 12, below, the indicated polymers are formulated into Inventive and Comparative coating formulations by letting the ingredients down in the indicated binder polymer. Polymer encapsulated opacifying pigments 9 and 10 can be formulated with indicated hard polymers at 0 VOC and 18% OPVC, and resulting paint showed low MFFT (<10° C.). On the other hand, the polymer encapsulated opacifying pigments 11 and 12 formulated with hard polymers at 0 VOC and 18% OPVC would require ~100 g/L VOC to get good film formation. To make the coating formulations an IKA RW 16 basic overhead stirrer (IKA Works, Inc., Wilmington, N.C.) was used.

TABLE 10

Coating Formulations with Hard Polymer 1

| | Example | | | |
|---|---|---|---|---|
| Material or Property | 15 | 16C | 17 | 18C |
| % OPVC | 18.00 | 18.00 | 18.00 | 18.00 |
| Volume Solids | 35.00 | 35.00 | 35.00 | 35.00 |
| Weight Solids | 46.79 | 46.69 | 46.79 | 46.69 |
| VOC Generic (g/l) (Excl. Water) | 0 | 0 | 0 | 0 |
| Polymer Encapsulated Opacifying Pigment 9 | 60.08 | | | |
| Polymer Encapsulated Opacifying Pigment 10 | | | 60.08 | |
| Hard Polymer 1 | 22.79 | 22.84 | 22.78 | 22.83 |
| Defoamer (BYK-028) | 0.10 | 0.10 | 0.10 | 0.10 |
| TiO$_2$ (TiPure ™ R-746) | | 26.77 | | 26.77 |
| Polymer 2C | | 27.98 | | |
| Polymer 3C | | | | 28.08 |
| Sodium Nitrite (15 w/w in water) | 0.88 | 0.88 | 0.88 | 0.88 |
| Water | 15.05 | 20.44 | 15.04 | 20.12 |
| Aqua Ammonia (15 wt. %) | 0.11 | 0.00 | 0.11 | 0.19 |
| Acrysol ™ RM-2020 NPR Rheology Modifier (HEUR) | 0.78 | 0.79 | 0.78 | 0.79 |
| Acrysol ™ RM-8W Rheology Modifier (HEUR) | 0.20 | 0.20 | 0.23 | 0.24 |
| Total Weight | 100 | 100 | 100 | 100 |

TABLE 11

Coating Formulations with Hard Polymer 2

| | Example | | | |
|---|---|---|---|---|
| Material or Property | 22 | 23 | 26C | 27C |
| % OPVC | 18 | 18 | 18 | 18 |
| Volume Solids | 35 | 35 | 35 | 35 |
| Weight Solids | 46.86 | 46.86 | 46.77 | 46.77 |
| VOC Generic (g/l) (Excl. Water) | 0 | 0 | 0 | 0 |
| Polymer Encapsulated Opacifying Pigment 9 | 60.03 | | | |
| Polymer Encapsulated Opacifying Pigment 10 | | 60.04 | | |
| Hard Polymer 2 | 24.90 | 24.91 | 24.96 | 24.78 |
| BYK-028 Defoamer | 0.10 | 0.10 | 0.10 | 0.10 |

TABLE 11-continued

Coating Formulations with Hard Polymer 2

| Material or Property | Example 22 | Example 23 | Example 26C | Example 27C |
|---|---|---|---|---|
| TiPure ™ R-746 TiO$_2$ | | | 26.76 | 26.76 |
| Polymer 2C | | | 27.94 | |
| Polymer 3C | | | | 28.18 |
| Sodium Nitrite (15% w/w in water) | 0.88 | 0.88 | 0.88 | 0.88 |
| Water | 12.73 | 12.74 | 17.98 | 17.93 |
| Aqua Ammonia (15 wt. %) | 0.27 | 0.28 | 0.25 | 0.25 |
| Acrysol RM-2020 NPR Rheology Modifier[1] | 0.79 | 0.79 | 0.84 | 0.84 |
| Acrysol RM-8W Rheology Modifer[1] | 0.29 | 0.26 | 0.29 | 0.29 |
| Total Weight | 100 | 100 | 100 | 100 |

[1]HEUR polymer

TABLE 12

Coating Formulations with Polymer 1E

| Material or Property | Example 20 | Example 21 | Example 24C | Example 25C |
|---|---|---|---|---|
| PVC | 18 | 18 | 18 | 18 |
| Volume Solids | 35 | 35 | 35 | 35 |
| Weight Solids | 47.08 | 47.08 | 46.99 | 46.99 |
| VOC Generic (g/l) (Excl. Water) | 0 | 0 | 0 | 0 |
| Pigment 9 | 59.77 | | | |
| Pigment 10 | | 59.77 | | |
| Binder 1E | 23.88 | 23.88 | 23.96 | 24.01 |
| BYK-028 Defoamer | 0.10 | 0.10 | 0.10 | 0.10 |
| TiPure ™ R-746 TiO$_2$ | | | 26.63 | 26.63 |
| Polymer 2C | | | 27.78 | |
| Polymer 3C | | | | 27.84 |
| Sodium Nitrite (15% w/w in water) | 0.88 | 0.88 | 0.88 | 0.88 |
| Water | 14.21 | 14.18 | 19.36 | 19.25 |
| Aqua Ammonia (15 wt. %) | 0.24 | 0.27 | 0.24 | 0.24 |
| Acrysol RM-2020 NPR Rheology Modifier[1] | 0.78 | 0.78 | 0.81 | 0.81 |
| Acrysol RM-8W Rheology Modifer[1] | 0.15 | 0.15 | 0.23 | 0.22 |
| Total Weight | 100 | 100 | 100 | 100 |

2. HEUR polymer

As shown below in Tables 13A and B, below, binder Polymer 1B requires a relatively high level of coalescent to formulate, around 100 g/L. The inventors were able to achieve similar or better performance at zero VOC. In particular, the 1-day König hardness and room-temperature block resistance are much better in Examples 15 and 17 when compared to Example 19C. Example 16C and 18C controls are blends of soft and hard polymers with TiO$_2$, which shows much lower gloss than the invention and is not practical for real application.

TABLE 13A

Performance In Comparison With Soft-Hard 2-stage (SHE) Polymers and Blends

| Example | Material | % OPVC | VOC (g/l) | MFFT (visual/mechanical) (° C.) |
|---|---|---|---|---|
| 15 | Polymer Encapsulated Opacifying Pigment 9 + Hard Polymer 1 | 18 | 0 | <0/9 |
| 16C | TiO$_2$ + Polymer 2C + Hard Polymer 1 | 18 | 0 | <0/2.3 |
| 17 | Polymer Encapsulated Opacifying Pigment10 + Hard Polymer 1 | 18 | 0 | <0/3.4 |
| 18C | TiO$_2$ + Polymer 3C + Hard Polymer 1 | 18 | 0 | <0/2.3 |
| 19C* | Polymer 1B (SHE polymer) | 18 | 94 | <0/<0 |

TABLE 13B

Performance In Comparison With SHE Polymers and Blends

| Example | König Hardness 1 day | König Hardness 7 day | RT block 1 day | Hot block 1 day | RT block 7 day | Hot Block 7 day | 20° Gloss | 60° Gloss |
|---|---|---|---|---|---|---|---|---|
| 15 | 23.1 | 21.6 | 8 | 3 | 8 | 2 | 60 | 81 |
| 16C | 21.6 | 21.1 | 7 | 3 | 8 | 3 | 11 | 52 |
| 17 | 17.2 | 16.6 | 7 | 3 | 7 | 2 | 62 | 82 |
| 18C | 27.4 | 25.9 | 6 | 4 | 8 | 4 | 11 | 51 |
| 19C* | 10 | 15.8 | 3 | 3 | 8 | 3 | 68 | 84 |

*The Example 19C composition was formulated and tested separately in Table 13a and 13B, so the data varies from Table 6B & 6D.

As shown in Table 13A, above, the inventive compositions of Examples 15 and 17 can be formulated at zero VOC to give shelf stable compositions which exhibit better coating gloss than any comparative (Examples 16C and 18C) that is zero VOC. As shown in Table 13B, above, the Inventive compositions exhibited better 1-day block resistance than any comparative Example and faster hardness development than the comparative SHE polymer of Example 19C.

As shown in Tables 14 A and B, below, coating formulations of the present invention formulated as in

TABLE 14A

Coating Performance

| Example | Formulation | % OPVC | VOC (g/L) | MFFT (visual/mechanical) (° C.) |
|---|---|---|---|---|
| 20 | Polymer Encapsulated Opacifying Pigment 9 + Binder 1E | 18 | 0 | <0/4.9 |
| 21 | Polymer Encapsulated Opacifying Pigment 10 + Binder 1E | 18 | 0 | <0/0 |
| 22 | Polymer Encapsulated Opacifying Pigment 9 + Hard polymer 2 | 18 | 0 | 1.4/3.6 |
| 23 | Polymer Encapsulated Opacifying Pigment 10 + Hard polymer 2 | 18 | 0 | <0/4.7 |
| 24C | TiO$_2$ + polymer 2C + Binder 1E | 18 | 0 | 0.4/4.5 |
| 25C | TiO$_2$ + polymer 3C + Binder 1E | 18 | 0 | <0/3.7 |
| 26C | TiO$_2$ + polymer 2C + Hard polymer 2 | 18 | 0 | <0/3.2 |
| 27C | TiO$_2$ + polymer 3C + Hard polymer 2 | 18 | 0 | <0/0.6 |

TABLE 14B

| | | | | Coating Performance | | | | |
|---|---|---|---|---|---|---|---|---|
| Example | König Hardness 1 day | König Hardness 7 day | RT block, 1 day | Hot block, 1 day | RT block, 7 day | Hot Block 7 day | 20° Gloss | 60° Gloss |
| 19C* | 9.2 | 18.0 | 3 | 2 | 7 | 4 | 69 | 85 |
| 20 | 20.6 | 22.6 | 8 | 3 | 8 | 6 | 52 | 75 |
| 21 | 15.9 | 17.9 | 8 | 7 | 8 | 7 | 53 | 75 |
| 22 | 23.9 | 25.9 | 9 | 6 | 9 | 7 | 36 | 67 |
| 23 | 18.6 | 20.6 | 8 | 7 | 9 | 8 | 34 | 67 |
| 24C | 25.3 | 28.6 | 8 | 7 | 8 | 7 | 14 | 51 |
| 25C | 20 | 23.3 | 7 | 6 | 8 | 7 | 5 | 27 |
| 26C | 25.9 | 27.9 | 9 | 3 | 10 | 4 | 3 | 21 |
| 27C | 19.9 | 21.9 | 8 | 3 | 9 | 3 | 3 | 17 |

*The Example 19C composition was tested separately in Table 14B and so data varies from Tables 13A and 13B.

As shown in Tables 14A and 14B, above, the use of soft polymer encapsulated pigment and hard binder polymers enable coatings that can be formulated at zero VOC. Binder polymer 1B in Example 19C can absorb onto a $TiO_2$ surface to form polymer opacifying pigment composites but exhibits poor 1 day hardness development and block resistance. The combinations of soft and hard polymers without polymer encapsulated pigments in Examples 24C, 25C, 26C and 27C showed acceptable 1-day block resistance and hardness development than the coating in Example 19C; however, the inventive polymer encapsulated pigment compositions exhibit far better gloss in a coating.

We claim:

1. An aqueous composition having a % opacifying pigment volume concentration (% OPVC) of from 2 to 25 comprising
    (i) at least one opacifier composition in the form of particles chosen from an at least partially polymer encapsulated opacifying pigment, a polymer opacifying pigment composite and their mixtures, the opacifying pigment, encapsulated in and/or as a composite with at least one soft polymer having a measured glass transition temperature (measured Tg) of from −60° C. to 5° C., and
    (ii) a hard binder polymer having a measured Tg of at least 30° C.,
    wherein the hard binder polymer has a weight average particle size of 120 nm or less,
    further wherein, the ratio of the weight average particle size of the opacifier composition to that of the hard binder polymer is from 2:1 to 12:1 and,
    still further wherein the volume ratio of the opacifying pigment to the soft polymer solids in the opacifier composition is from 1:3 to 1:12.

2. The aqueous composition as claimed in claim 1 having a % OPVC 20 or less.

3. The aqueous composition as claimed in claim 1, wherein the opacifying pigment in the (i) at least one opacifier composition comprises titanium dioxide ($TiO_2$).

4. The aqueous composition as claimed in claim 1, wherein the soft polymer in the (i) at least one opacifier composition has a measured Tg of 0° C. or less.

5. The aqueous composition as claimed in claim 1, wherein the (ii) hard binder polymer has a measured Tg of at least 50° C.

6. The aqueous composition as claimed in claim 1, wherein the (i) at least one opacifier composition has a weight average particle size of 260 nm to 1500 nm.

7. The aqueous composition as claimed in claim 1, wherein the soft polymer in the (i) opacifier composition and the (ii) hard binder polymer are each emulsion copolymers.

8. The aqueous composition as claimed in claim 1, wherein the opacifying pigment in the (i) opacifier composition has an index of refraction [nD (20° C.)] that is at least 1.8.

9. The aqueous composition as claimed in claim 1, wherein the at least one soft polymer has a measured glass transition temperature of −60° C. to −19° C.

10. The aqueous composition as claimed in claim 9, wherein the hard binder polymer has a measured Tg of 30 to 52° C.

11. The aqueous composition according to claim 10, wherein the soft polymer is an emulsion copolymer selected from the group consisting of acrylic polymer, styrene-acrylic polymer, vinyl acrylic polymer, and combinations thereof.

12. The aqueous composition according to claim 11, wherein the soft polymer is an emulsion copolymer of ethylhexyl acrylate, methyl methacrylate, and phosphoethyl methacrylate, and the hard polymer is a copolymer of styrene, ethylhexyl acrylate, methyl methacrylate, and glacial methacrylic acid.

13. The aqueous composition according to claim 1, wherein the soft polymer comprises from 0.5 to 5 wt %, based on the total weight of monomers used to make the soft polymer, of at least one phosphorous acid monomer.

14. The aqueous composition according to claim 13, wherein the phosphorous acid monomer is selected from the group consisting of 2-phosphoethyl(meth)acrylate, 2-phosphopropyl(meth)acrylate, 3-phosphopropyl(meth)acrylate, and 3-phospho-2-hydroxypropyl(meth)acrylate.

15. A method of making the aqueous composition as claimed in claim 1, comprising providing an aqueous composition of at least one opacifying pigment having a weight average particle size of at least 150 nm to 1200 nm, (i) forming an opacifier composition by aqueous emulsion copolymerizing a monomer mixture to form soft polymer in the presence of the aqueous composition of the at least one opacifying pigment to form an at least partially soft polymer encapsulated opacifying pigment; and (ii) combining the opacifier composition with a hard binder polymer to form an aqueous composition having a % opacifying pigment volume concentration (% OPVC) of from 2 to 25.

* * * * *